United States Patent [19]

Takata et al.

[11] Patent Number: 4,975,642

[45] Date of Patent: Dec. 4, 1990

[54] METHOD OF AND APPARATUS FOR MEASURING REVOLUTION SPEED IN RESPONSE TO PULSE SIGNALS DETECTED FROM A ROTARY MEMBER

[75] Inventors: Koji Takata; Tatsuji Matsumoto, both of Itami, Japan

[73] Assignee: Sumitomo Electric Industries, Ltd., Osaka, Japan

[21] Appl. No.: 337,829

[22] Filed: Apr. 14, 1989

[30] Foreign Application Priority Data

Apr. 15, 1988 [JP] Japan .................. 63-94238

[51] Int. Cl.$^5$ ............................................. G01P 3/489
[52] U.S. Cl. .................................................. 324/166
[58] Field of Search ............................. 324/160-163, 324/166-175; 310/156, 160, DIG. 3; 322/29, 32

[56] References Cited

U.S. PATENT DOCUMENTS

| | | | |
|---|---|---|---|
| 4,281,388 | 7/1981 | Friend et al. | 324/162 X |
| 4,355,364 | 10/1982 | Gudat | 324/166 X |
| 4,358,828 | 11/1982 | Reid et al. | 324/166 X |
| 4,408,290 | 10/1983 | Kubo et al. | 324/162 X |
| 4,409,664 | 10/1983 | Skarvada | 324/160 X |
| 4,470,011 | 9/1984 | Masuda | 324/166 |
| 4,564,917 | 1/1986 | Yamada et al. | 324/160 X |
| 4,569,027 | 2/1986 | Nakano et al. | 324/160 X |
| 4,584,528 | 4/1986 | Ohmae et al. | 324/166 |
| 4,667,297 | 5/1987 | Kawai | 324/166 X |
| 4,716,535 | 12/1987 | Yoshida et al. | 324/166 X |
| 4,811,232 | 3/1989 | Hoashi et al. | 364/426.02 |

FOREIGN PATENT DOCUMENTS 0090717 5/1983 European Pat. Off. .

OTHER PUBLICATIONS

Masao Ishikawa, "Electronic Speed Indicator for Vehicle", Patent Abstracts of Japan, Nov. 19, 1982, p. 156.

*Primary Examiner*—Gerard R. Strecker
*Assistant Examiner*—Warren S. Edmonds
*Attorney, Agent, or Firm*—Cushman, Darby & Cushman

[57] ABSTRACT

A system (apparatus and method) for measuring a revolution speed of a rotary member improves accuracy by estimating the speed during a unit operation period in response to pulse signals detected from the rotary member. When a pulse signal is not detected, the system obtains the revolution speed by selecting the lesser of a first estimated value and a second estimated value. The first estimated value is determined on the basis of the calculated revolution speed during the previous unit operation period and also the calculated acceleration during that previous operation period. The second estimated value is determined on the basis of a lapse time between a detected time of the last signal and the completion time of the current unit operation period. If a pulse is subsequently detected in the next unit operation period, the revolution speed is determined by comparing the toal number of pulses detected in the next unit operation period with the total time between the last pulse of the previous unit operation period and the last pulse of the next unit operation period.

7 Claims, 3 Drawing Sheets

METHOD OF AND APPARATUS FOR MEASURING REVOLUTION SPEED IN RESPONSE TO PULSE SIGNALS DETECTED FROM A ROTARY MEMBER

BACKGROUND OF THE INVENTION

The present invention relates to a method and apparatus for measuring revolution speed, which generates pulse signals at an interval in inverse proportion to the revolution speed of a rotary member and calculates the revolution speed of the rotary member from the spacing of the pulse signals thus generated.

Although it is known to calculate the revolution speed of the rotary member either from the number of the pulses within a unit time or from the pulse spacing, errors in the calculation of revolution speed of the rotary member become larger at low speed or at high speed. Therefore, methods are known which use both the number of pulses N within a unit operation period TM, and also the lapse time T between the lead pulse of a unit operation period and the lead pulse of the previous unit operation period and the lead pulse of the previous unit operation period. Accordingly, the revolution speed V is determined as follows.

$$V = 2\pi RN/ZT = \alpha N/T$$

In this relationship, the radius of the rotary member is R, and the number of pulses generated per revolution is Z. Rather than using the time period between lead pulses, the time period between final pulses can also be used.

FIG. 4 is a chart showing a relationship between a unit operation period TM, a lapse time T, and a number of pulses N. Because a varying lapse time T (like T1 through T4) is used instead of the fixed operation period TM, operational accuracy is improved. However, when the revolution speed becomes extremely low, the number N of the pulses fed into the unit operation period TM becomes zero (N=0). It therefore becomes impossible to carry out the above determination of revolution speed V.

In order to solve this problem, systems have been proposed which estimate the revolution speed for periods where N=0 so that system operation is not hindered (for example, see Japanese Laid-Open Patent Application Tokkaisho No. 62-241755). The above system estimates the speed for N=0 periods from the revolution speed and the acceleration obtained for the previous period. A measured speed is only obtained in the next period when a pulse is finally detected. In the meantime, the acceleration of this period is estimated using the estimated speed for previous period and the measured speed of the previous period. Also, when the acceleration for the previous period is positive, it is assumed to be zero (0) at the estimation of the speed for N=0 period.

In the system disclosed above, the estimated value of the speed for N=0 periods is obtained using the speed estimated during the previous period. When two or more N=0 periods follow each other, estimation errors cumulatively add to each other. Accordingly, output of the system varies considerably from the actual speed.

Furthermore, the speed curve connecting the measured speed with the estimated speed may not be smooth. The determined acceleration in particular, because it is the derivative of speed, becomes erratic.

Moreover, such prior art systems cannot operate during acceleration. Such systems are directed only toward determining deceleration.

SUMMARY OF THE INVENTION

Accordingly, an object of the present invention is to provide a method and apparatus for measuring revolution speed with improved accuracy in estimating speed for a unit operation period when pulses have not been detected during unit operation periods. It is therefore also an object of this invention to generate smoother speed curves under those conditions. It is also desirable that this invention performs these functions both during deceleration and acceleration.

For the solution of these problems, the present invention provides first and second embodiments to determine revolution speed for the unit operation periods in which pulse signals have not been detected during a fixed unit operation period TM. These embodiments select the smaller value of two estimated values, one being an estimated value of the revolution speed for the current unit operation period obtained using the revolution speed and the calculated deceleration of the previous unit operation period, the other being an estimated value of the revolution speed obtained by assuming that the number of pulses N is 1 and the lapse time T is the time from the detection time of the last pulse signal to the completion time of the current unit operation period.

According to third and fourth embodiments of the present invention, when pulse signals are not detected during one or more continuous unit operation periods, pulse signals are detected during the next current unit operation period. According to these embodiments, the revolution speed calculated during the previous unit operation period is ignored and the revolution speed for the current unit operation period is calculated using the lapse time from the detection time of the last pulse signal to the detection time of the pulse signal during the current unit operation period. The acceleration for the current unit operation period is then calculated using the revolution speed for the current unit operation period, the revolution speed calculated for the unit operation period in which the last pulse signal is detected, and the lapse time between these pulses.

In the first and second embodiments, the latter estimated value of the revolution speed (obtained using the lapse time between the detection time of the last pulse signal and the completion time of the current unit operation period) is the maximum possible revolution speed. This estimated value is obtained if a pulse is detected at the end of the current unit operation period. This estimation is not effected by calculations for the previous period which are inevitably estimated values if the period is a no-pulse period. Because this estimation depends on the last pulse signal actually detected, estimation errors do not accumulate when no-pulse periods persist. Because the smaller estimation is selected to be the revolution speed for the no-pulse period through the comparison between the maximum possible estimated value and the estimated value of the revolution speed obtained from the extension of the operation result for the previous unit operation period, improved estimation precision is obtained compared to the case where an estimated revolution speed is obtained from the extension of the operation result for the previous unit operation period which was directly assumed to be the revolution speed.

In the case where pulse signals are detected after the no-pulse period using the third and fourth embodiments, revolution speed and acceleration are calculated in accordance with the last pulse signal actually detected and the pulse signal currently detected. A value closer to the actual speed is therefore determined to be the revolution speed and the acceleration and estimation errors do not accumulate even if the non-pulse period continues.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENT

Figure 1:
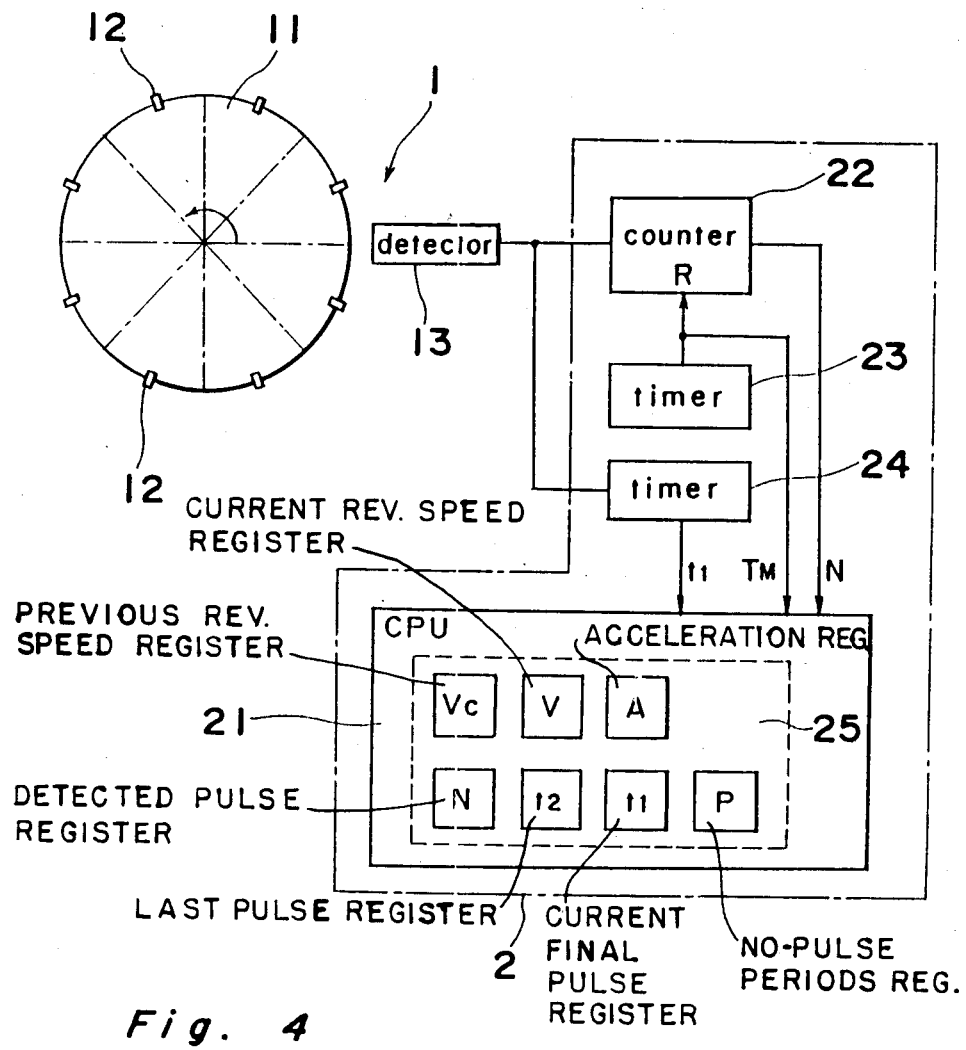
FIG. 1 is a schematic block diagram of an apparatus in one embodiment of the present invention.
Figure 4:
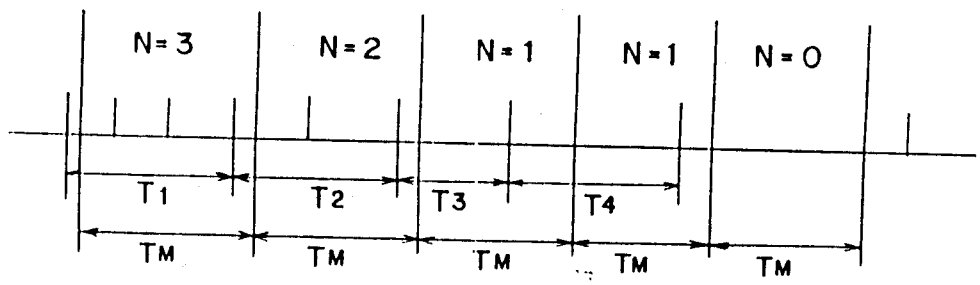
FIG. 4 is a view for illustrating the general revolution speed measuring method.

Before the description of the present invention proceeds, it is to be noted that like parts are designated by like reference numerals through the accompanying drawings.

Referring now to the drawings, there is shown in FIG. 1 is a schematic block diagram of an apparatus according to one preferred embodiment of the present invention, which includes a pulse generating means 1 for generating pulse signals at an interval in inverse proportion to the revolution speed of a rotary member 11, and an operation means 2 for effecting various types of operations. The pulse generating means 1 is, for example, composed of a plurality of magnets 12 disposed at equal intervals on the outer periphery of the rotary member 11, and an electromagnetic pick up 13 disposed to detect the magnets 12. The operation means 2 is composed of a counter 22, a timer 23 for counter use, and a reference timer 24 for the time use. A CPU 21 contains a memory 25 for storing the various types of data being provided in the CPU.

Figure 2:
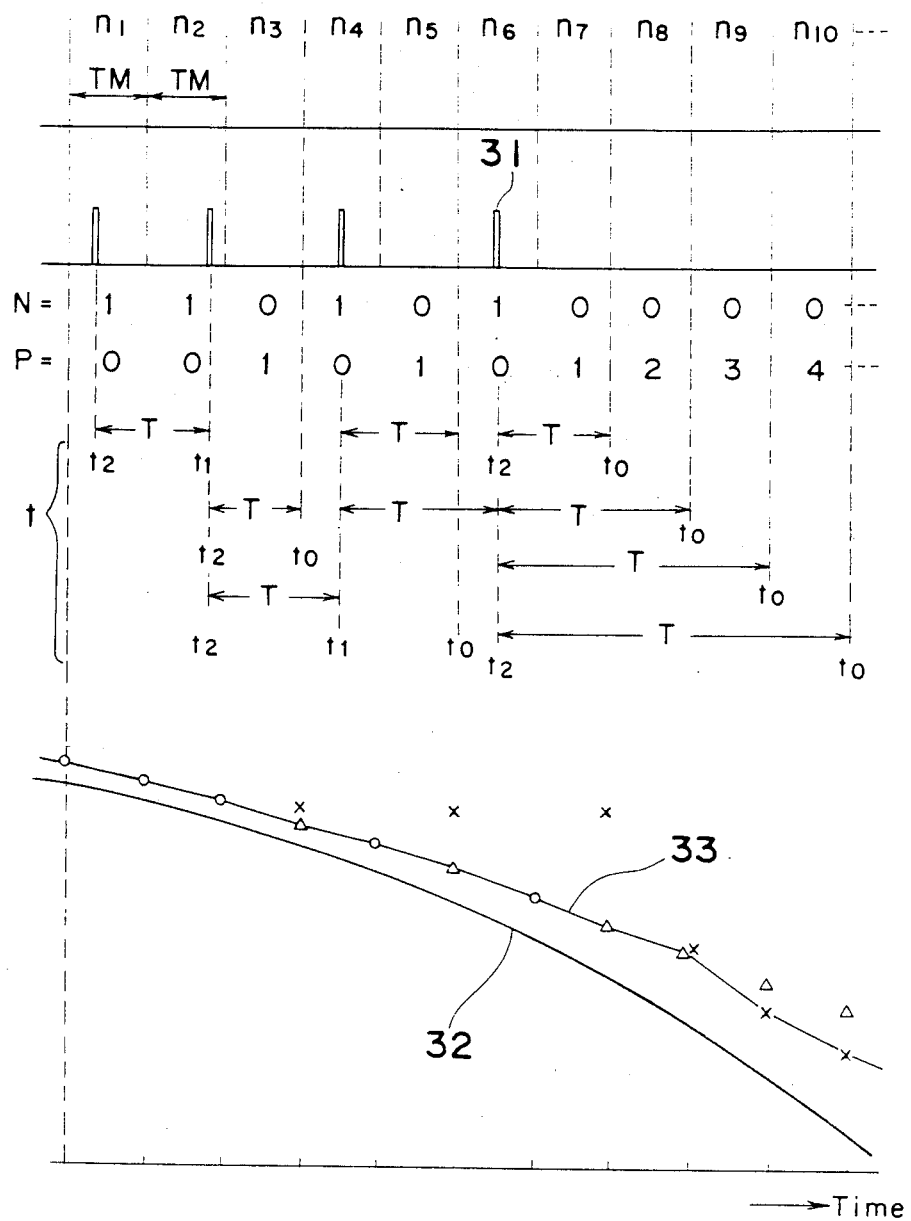
FIG. 2 is a wave form chart for illustrating the operation.

FIG. 2 is a wave-form chart for illustrating the operation of the present invention. FIG. 2 includes pulse signals 31, an actual revolution speed curve 32 of the rotary member 11, and a revolution speed curve 33 determined according to this invention. In the chart, reference character N is the number of the pulses detected during individual unit operation periods TM. P is the number of the continuations of no-pulse unit operation periods. T is the pulse interval or lapse time. Reference character t is a time; reference character t0 is the completion time of the individual unit operation period; reference character t1 is the final pulse detection time during current unit operation period; and reference character t2 marks the final pulse detection time during the unit operation period in which a last pulse has been detected. Reference characters n1, n2, ... show the numbers of the unit operation period illustration in the chart.

FIG. 2 shows an example in which the pulse signal 31 is detected during a deceleration phase.

Operation of the invention according to FIG. 2 will be described hereinafter with reference to the flow chart of FIG. 3, wherein V is the revolution speed to be obtained for the current period, and Vc is the revolution speed obtained for the previous period. A is the acceleration, and $\alpha(=2\pi R/Z)$ is a constant obtained from radium R of the rotary member 11 and the number of pulses Z during one rotation of rotary member 11. P represents the number of successive periods in which no pulses have been detected. PM is the maximum value allowed for P at which the estimation operation is closed assuming the rotary member 11 is a standstill. PM is set in advance, for example, to 8.

Figure 3:
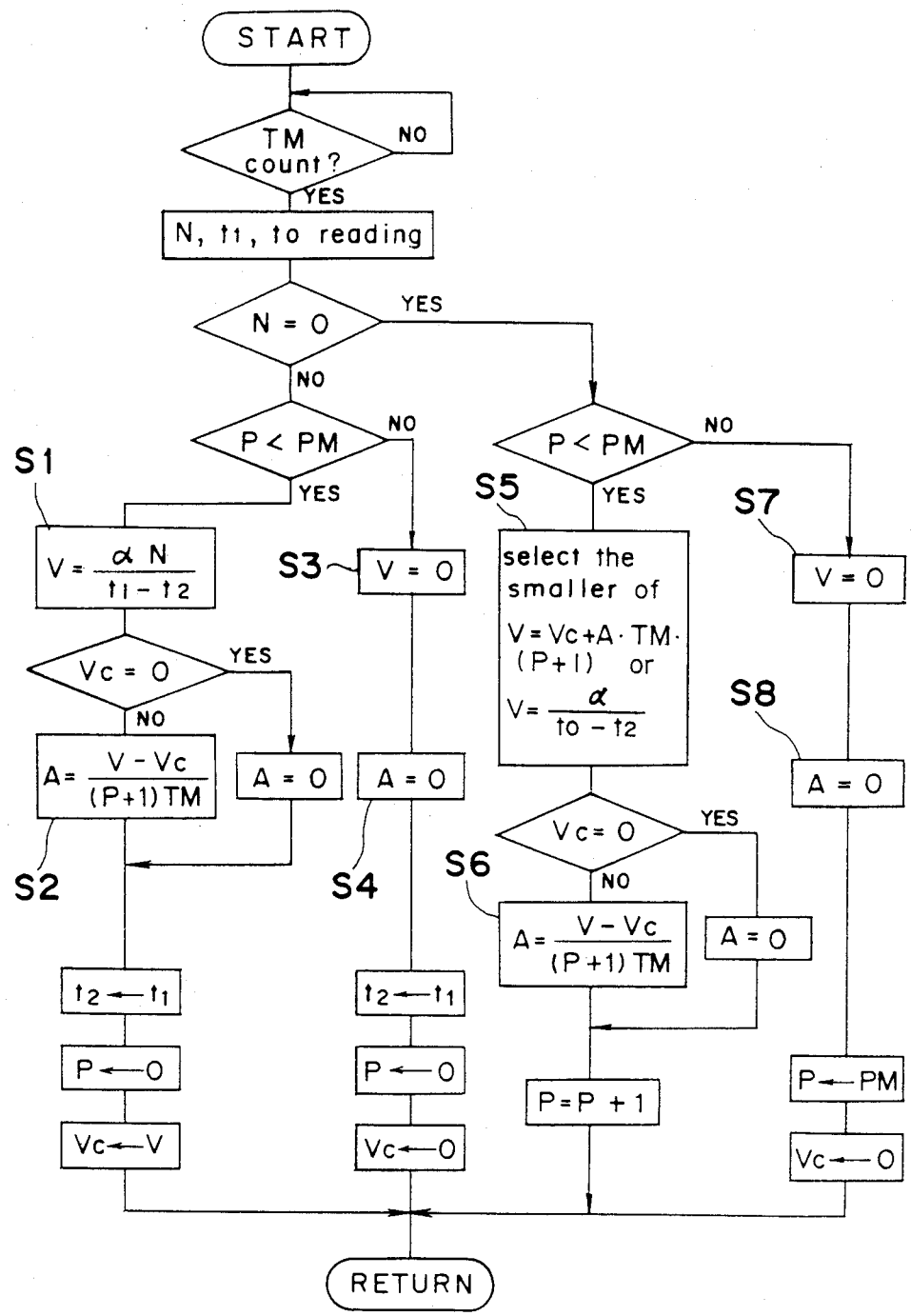
FIG. 3 is a flow chart showing the operation procedure.

Processing occurs at the end of each unit operation period TM according to FIG. 3. Both pulse number N for the current period and the final pulse detection time t1 are read at the end of each unit operation period TM. If N is not 0, a determination is made whether or not P is smaller than PM (P<PM). If P<PM (for example, as shown in the unit operation period n2), processing proceeds to step S1. Speed V is then calculated according to the following equation.

$$V = \frac{\alpha N}{t1 - t2} \quad (1)$$

Note that in the case of an operation period such as n2 of FIG. 2, the actual pulse detection time is used for both t1 and t2 because a pulse was detected during the previous operation period n1. If Vc does not equal zero, processing proceeds to step S2. Acceleration A is then calculated according to the following equation.

$$A = \frac{V - Vc}{(P + 1)TM} \quad (2)$$

However, if Vc=0, A is assumed to be 0.

After the determination of A, the data values are renewed: t2←t1, P←0, Vc←V. Processing then proceeds to the next unit operation period.

It is to be noted that the operation t2←t1 does not occur during no-pulse operation periods (described later). Therefore, if the previous period has no pulse, t2 is not updated. The lapse time T from detection of the last pulse t2 to detection time t1 in the current operation period is used as the t1-t2 in equation (1). See periods n4 or n6 of the illustrated example FIG. 2.

If, after reading N, N does not equal 0 and P<PM is not true (namely, P=PM), it is assumed that a movement is just beginning after some periods of complete stop. V is therefore assumed to be 0 at step S3. A is also assumed to be 0 at step S4. The data values are then renewed: t2←t1, P←0, Vc←0 and processing proceeds to the next unit operation period.

If, on the other hand, N does equal 0, the operation period of the no-pulse period is processed. If P<PM, for example, periods n3, n5, and n7, and when pulses exist in the previous operation period two estimations are made for the revolution speed V. One estimated value of the speed is determined in accordance with the following equation.

$$V = Vc + A.TM.(P+1) \quad (3)$$

Revolution speed Vc and the acceleration A calculated from the previous operation period are used. The second estimation value of the speed is determined using the following equation.

$$V = \frac{a}{t0 - t2} \quad (4)$$

As shown in the step S5, the lapse time T from the detection time t2 of the last pulse to the completion time t0 of the current operation period is used to calculate V. The smaller of the two values obtained by equations (3) and (4) is then selected to be the speed V of the current unit operation period. Unless Vc=0, processing proceeds to step S6 and the acceleration A is calculated in accordance with equation (2). If, on the other hand, Vc=0, no pulse has been a no pulse period, P is incremented according to P=P+1. Because there is no t1, t2←t1 is not executed. Similarly, Vc←V is also not executed because Vc should be a definite value determined only when a pulse is detected.

Therefore, when the previous operation period has no pulses(i.e., P≠0 as in period n8), the detection time of the last detected pulse signal is used as the time t2. This last detected pulse can have occurred several periods previously.

If N=0 is satisfied, but P<PM is not satisfied, it is assumed that rotary member 11 is at a standstill because the no pulse periods have continued longer than PM. The estimated value of the speed and acceleration are both set to 0. V is set to 0 at step S7, A is set to 0 at step S8, and data values are renewed (e.g., P←PM, Vc←0).

The curve 33 of FIG. 2 shows a revolution speed curve obtained from the operation described above. In this curve, speeds denoted with 0's were determined using equation (1), speeds denoted with Δ's were estimated using equation (3), and speeds denoted with X's were estimated using equation (4). Note that the smaller value of the two estimations is always the better approximation of actual revolution speed.

As is clear from the foregoing description, according to the first and second embodiments, revolution speed for periods when pulse signals are not detected is determined by selecting the smaller value of the two estimated values. One estimated value is obtained using the revolution speed and the acceleration calculated for the previous unit operation period. The second estimated value is obtained using the lapse time from the detection time of the last pulse signal to the completion time of the current unit operation period assuming that the number of pulses is 1.

In the third and fourth embodiments, in situations where a pulse signal has been detected after a no pulse period, revolution speed and acceleration of the current unit operation period are calculated using the lapse time from the detection time of the last pulse signal to the detection time of the pulse signal of the current.

Regardless of which embodiment is used, estimation errors do not accumulate. When the pulse interval becomes wider and the non-pulse period continues, the difference between the estimated values for non-pulse periods and the measured value for the pulse period becomes smaller. The revolution speed curve thus obtained is both smoother and also closer to the actual speed curve than prior art speed curves. Use of the present invention is therefore advantageous in the control of rotary members and other revolving items. Note that the above disclosed invention functions in both deceleration and acceleration phases.

Although the present invention has been fully described in connection with a preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for measuring a revolution speed of a rotary member which generates pulse signals at equal arc lengths and at intervals inversely proportional to said revolution speed, the method including the steps of:
    defining unit operation periods having a predetermined time duration;
    detecting and counting a number of said pulse signals during a current unit operation period;
    calculating a revolution speed of the rotary member for each unit operation period from said detected pulse signals when at least one of said pulse signals being detected and counted during said current unit operation period, said revolution speed calculating step including the steps of:
        measuring a lapse time, said lapse time being determined either between a leading pulse of said current unit operation period and a leading pulse of a previous unit operation period or between a final pulse of said current unit operation period and a final pulse of said previous unit operation period, and
        determining said revolution speed from said lapse time and said number of said pulse signals during said current unit operation period; and
    calculating a revolution speed of the rotary member for each unit operation period when no pulse signal is detected during said current unit operation period, said calculating step when no pulse signal is detected including the steps of:
        obtaining a first estimated value from a calculated revolution speed of said previous unit operation period and an acceleration from said previous unit operation period,
        obtaining a second estimated value from a lapse time between a detected time of a last detected signal and a completion time of the current unit operation period, and
        selecting as said revolution speed a lesser value between said first and second estimated value.

2. A method as claimed in claim 1, wherein said lapse time is determined either between a leading pulse of said current unit operation period and a leading pulse of a previous unit operation period or between a final pulse of said current unit operation period and a final pulse of said previous unit operation period.

3. A method as claimed in claim 1, wherein a plurality of unit operation periods having no detected pulse signal occurs between said current unit operation period having said detected pulse and said previous unit operation period having said second detected pulse.

4. A method as claimed in claim 3, wherein said calculating steps each include the step of determining an acceleration in accordance with said revolution speed of said current unit operation period, a revolution speed of said previous unit operation period having said second detected pulse, and said plurality of unit operation periods having no detected pulse signal.

5. An apparatus for measuring a revolution speed of a rotary member, the apparatus comprising:

means for generating pulse signals at equal arc lengths of rotation by said rotary member, said pulses being generated at intervals inversely proportional to said revolution speed;

timing means for defining unit operation periods having a predetermined time duration;

means for counting a number of said pulse signals during a current unit operation period;

means for detecting a final pulse detection time during said current unit operation period, said detecting means being responsive to said generating means; and a central processing unit, responsive to said timing means, said counting means and said detecting means, said central processing unit determining said revolution speed of said rotary member and comprising:

means for calculating a revolution speed of the rotary member for each unit operation period from said detected pulse signals when at least one of said pulse signals is detected and counted during said current unit operation, period said calculated means including:

means for measuring a lapse time, said lapse time being determined between said final pulse detection time of said current unit operation period and a second final pulse detection time of a previous unit operation period; and means for determining said revolution speed from said lapse time and said number of said pulse signals during said current unit operation period, and second means for calculating a revolution speed of the rotary member for each unit operation period when no pulse signal is detected during said current unit operation period, said second calculating means including:

means for obtaining a first estimated value from a calculated revolution speed of said previous unit operation period and an acceleration from said previous unit operation period;

means for obtaining a second estimated value from a lapse time between a detected time of a last detected signal and a completion time of the current unit operation period; and means for selecting as said revolution speed a lesser value between said first and second estimated values.

6. An apparatus as claimed in claim 5, wherein a plurality of unit operation periods having no detected pulse signal is located between said current unit operation period having said final pulse detection time and said previous unit operation period having said second final pulse detection.

7. An apparatus as claimed in claim 6, wherein said first and second calculating means each include means for determining an acceleration in accordance with said revolution speed of said current unit operation period, a revolution speed of said previous unit operation period having said second final pulse detection time, and said plurality of unit operation periods having no detected pulse signal.

* * * * *